(12) United States Patent
Dilley et al.

(10) Patent No.: US 7,758,097 B2
(45) Date of Patent: Jul. 20, 2010

(54) COVER ASSEMBLY FOR A VEHICLE STORAGE COMPARTMENT STRIKER

(75) Inventors: Jason Dilley, Marysville, OH (US); Ryan Larcom, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 12/178,729

(22) Filed: Jul. 24, 2008

(65) Prior Publication Data
US 2010/0019511 A1    Jan. 28, 2010

(51) Int. Cl.
*B62D 25/10*    (2006.01)

(52) U.S. Cl. ..................... 296/76; 296/193.11

(58) Field of Classification Search ............ 296/76, 296/107.08, 193.11, 24.34; 292/DIG. 23.24, 292/216, 347.17, 194; B62D 25/10
See application file for complete search history.

(56) References Cited

U.S. PATENT DOCUMENTS

| | | | |
|---|---|---|---|
| 4,225,166 A | 9/1980 | Tanaka et al. | |
| 5,342,103 A | 8/1994 | Tame et al. | |
| 5,346,240 A * | 9/1994 | Pettit | 280/438.1 |
| 5,632,515 A | 5/1997 | Dowling | |
| 6,042,160 A * | 3/2000 | Hamada et al. | 292/216 |
| 6,679,531 B2 | 1/2004 | Rogers, Jr. et al. | |
| 6,692,057 B2 * | 2/2004 | Igarashi et al. | 296/76 |
| 6,719,332 B2 * | 4/2004 | Sekulovic | 292/170 |
| 6,988,749 B2 | 1/2006 | Hashiba et al. | |
| 7,078,640 B2 | 7/2006 | Miyake et al. | |
| 7,222,893 B2 | 5/2007 | Miyake et al. | |

* cited by examiner

*Primary Examiner*—Patricia L Engle
*Assistant Examiner*—Pinel E Romain
(74) *Attorney, Agent, or Firm*—Mark E. Duell, Esq.; Emerson Thomsom + Bennett

(57) ABSTRACT

An improved method and apparatus relating to vehicle storage compartments is disclosed. Specifically, the apparatus relates to the concealment of vehicle storage compartment strikers and the method of manufacturing the apparatus. The improvement relates to the elimination of some metal components while maintaining durability of the apparatus.

16 Claims, 7 Drawing Sheets

COVER ASSEMBLY FOR A VEHICLE STORAGE COMPARTMENT STRIKER

I. BACKGROUND OF THE INVENTION

A. Field of Invention

This invention pertains to the art of methods and apparatuses regarding vehicle storage compartments and more particularly to methods and apparatuses regarding the concealment of vehicle storage compartment strikers.

B. Description of Related Art

Within the automotive industry, it is often considered aesthetically appealing to conceal mechanical parts from the view of the automobile owner. Specifically, apparatuses are known and used to conceal the striker of vehicle trunk connection mechanisms. One known apparatus is shown in FIGS. 1 and 2. FIG. 1 shows a rear storage compartment portion 10 of a vehicle rear trunk and FIG. 2 shows a close-up perspective view of the cover assembly 12. A flap 20 is supported by a shaft 18, springs 16 and 17, and a metal bracket 14. The metal bracket 14 is the foundation of this prior art assembly, as the metal bracket 14, shaft 18, and springs 16 and 17 create the mechanism by which the flap 20 rotates. The cover assembly 12 is assembled prior to being fastened into the storage compartment assembly 10. Once the springs 16 and 17 and flap 20 are installed on the shaft 18, the shaft 18 is then secured onto the metal bracket 14. From there, the two sides of the meal bracket 14 are fastened onto the rear storage compartment assembly 10.

While the just described apparatus generally works well for its intended purpose, it does have limitations. One limitation is the complexity and the component cost associated with manufacturing the automobile trunk connecting mechanisms. Another limitation is the use of the metal bracket. Such metal components increase the cost associated in manufacturing the assembly, increase weight of the automobile and make assembly more complex.

Therefore, what is needed is a trunk connecting mechanism that is lighter, less complex to manufacture and minimizes costs associated with the manufacture, while maintaining the required robustness of the apparatus.

II. SUMMARY OF THE INVENTION

According to one embodiment of the invention, a vehicle comprises a frame, a locomotion source operatively supported to the frame that provides locomotion for the vehicle, a storage compartment assembly comprising a storage compartment operatively supported to the frame, a lid that is closeable to substantially cover the storage compartment and that is openable to provide access to the storage compartment, a compartment portion formed in either the storage compartment or the lid, the compartment portion having an opening, a connection mechanism that connects the lid to the storage compartment in a closed condition to cover at least a portion of the storage compartment, the connection mechanism comprising, a striker positioned within the opening formed in the compartment portion, a latch mechanism that latches to the striker, the latch mechanism positioned on the other of the storage compartment or the lid, a cover assembly that substantially covers the opening, the cover assembly comprising a flap that is positionable to cover at least a portion of the opening and that is positionable to provide access to the striker, a shaft about which the flap pivots, the shaft having a first end with a knurled portion and a second end, a shaft support structure that supports the shaft to the compartment portion; the shaft support structure comprising a first extension surface positioned on one side of the opening and having a first hole that receives the knurled portion of the shaft creating a press fit with the first extension, and a second extension surface positioned substantially on the opposite side of the opening and having a second hole that receives the second end of the shaft, and a spring that biases the flap to cover the opening, and when the lid is closed, it causes a portion of the latch mechanism to contact the flap and pivot the flap to provide access to the post and causes the latch mechanism to latch to the striker.

According to another embodiment of the invention, the method of constructing the cover assembly includes a flap that covers at least a portion of the opening having a first and a second support sleeve, a shaft having a first end with a knurled portion and a second end; a support structure having an extension surface having a first hole on one side of the opening and a second hole on the opposing side of the opening; and a spring, beginning by inserting the first end of the shaft into the first hole on the first side of the support structure opening, inserting the knurled end of the shaft into the first flap support eyelet, inserting the knurled end of the shaft into the second flap support eyelet, inserting the spring around the knurled end of the shaft, and inserting the knurled end of the shaft into the second hole on the opposing side of the support structure opening, fastening the knurled end of the shaft to the extension surface and securing the spring into the flap support position.

One advantage of this invention is that it streamlines construction of the assembly, as it eliminates certain parts that were required in the prior art. The elimination of components required for manufacture shortens the time required for manufacture and saving ultimately saves money.

Another advantage of this invention is the robust nature of the assembly no longer requires that certain metal components be used. Metal is still required to be used for the spring and shaft, however, all other parts are made of less costly materials. This also saves money in manufacturing costs.

Still other benefits and advantages will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
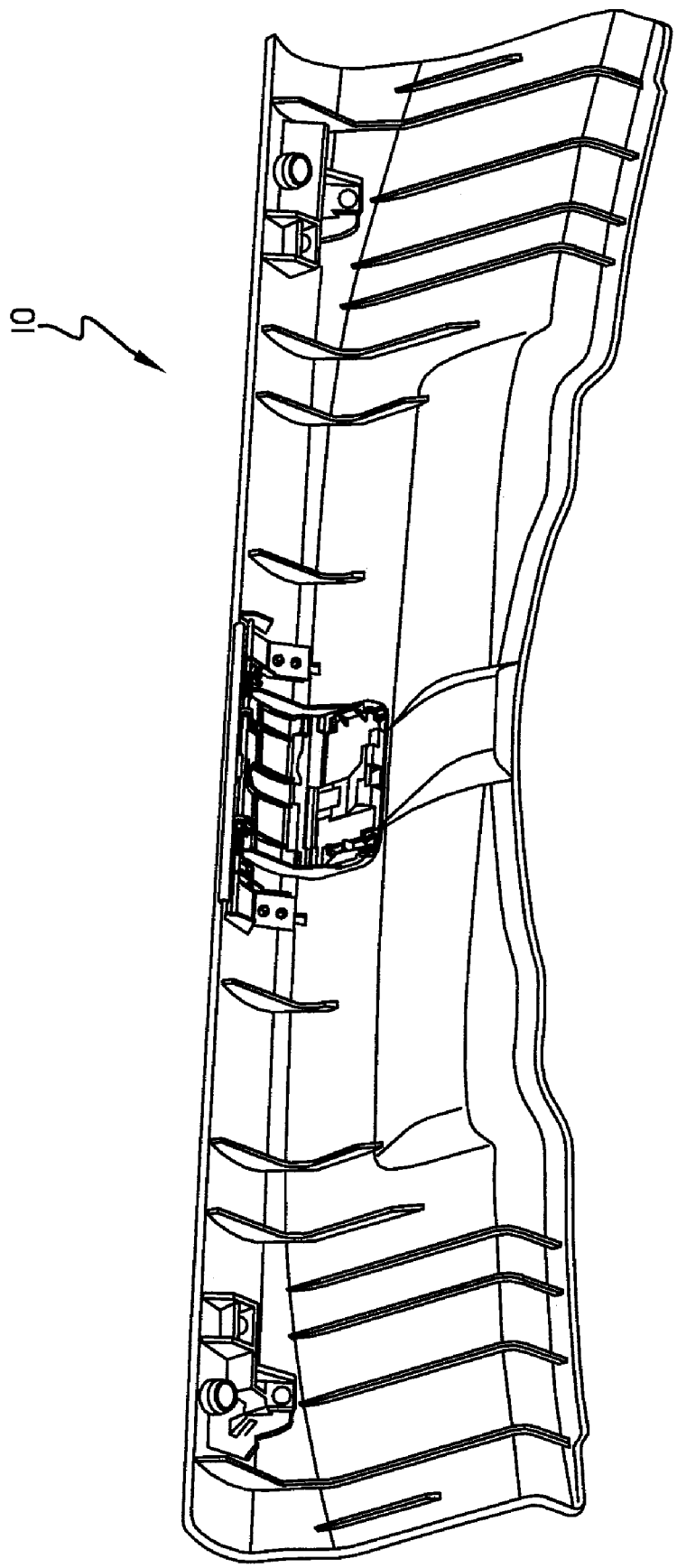
FIG. 1 is a perspective view of the prior art rear storage compartment assembly.
Figure 2:
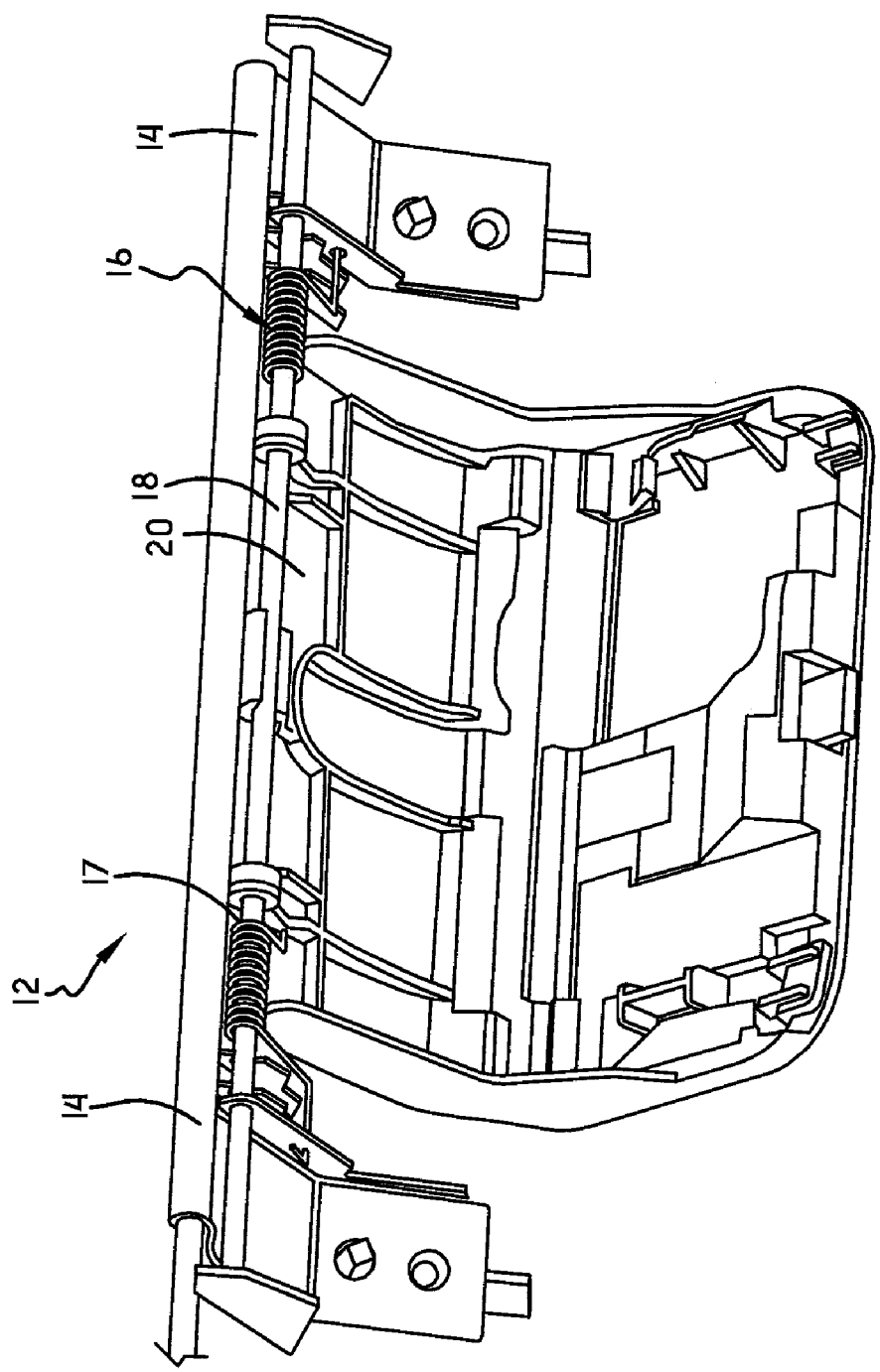
FIG. 2 is a close-up perspective view of a portion of the cover assembly shown in FIG. 1.
Figure 3:
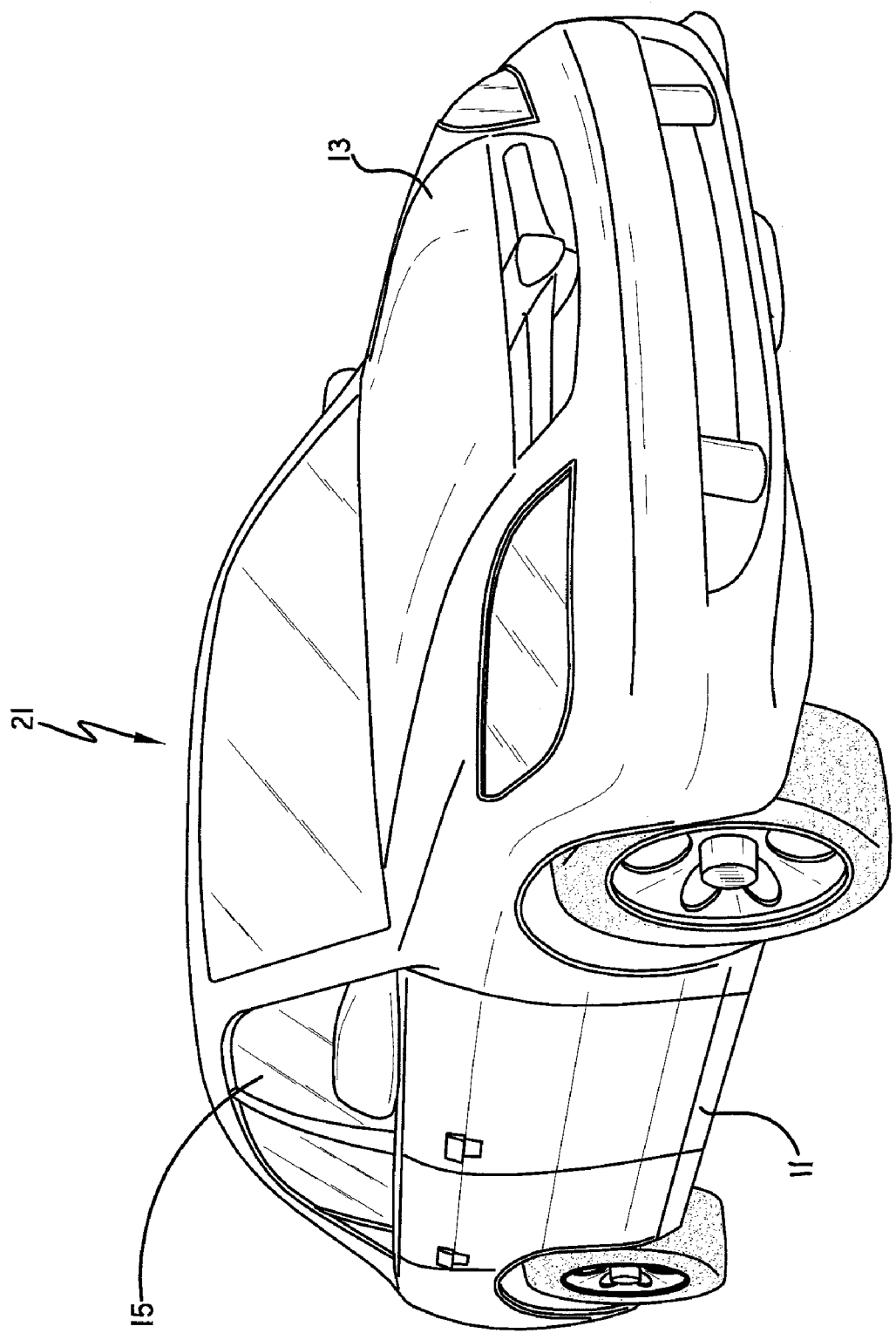
FIG. 3 is a perspective view of a vehicle having a rear storage compartment portion using a cover assembly according to one embodiment of this invention.

Referring now to the drawings wherein the showings are for purposes of illustrating embodiments of the invention only and not for purposes of limiting the same, and wherein like reference numerals are understood to refer to like components, FIG. 3 shows a vehicle 21 including a storage compartment assembly 38 using a cover assembly 24 according to one embodiment of this invention. The vehicle 21 may include a frame 11, a locomotion source 13, and seating for at least one occupant 15. While the vehicle 21 shown is an automobile, it is to be understood that the cover assembly 24 of this invention will work with any vehicle chosen with the skill of a person of skill in the art including, for some non-limiting examples, trucks, off-road vehicles, motorcycles, and boats. Similarly, while the storage compartment assembly 38 shown in this embodiment is positioned at the rear of the vehicle 21 and is commonly known as a "trunk," it is to be understood that the cover assembly 24 of this invention will work with any storage compartment assembly positioned at any location on the vehicle 21.

Figure 3A:
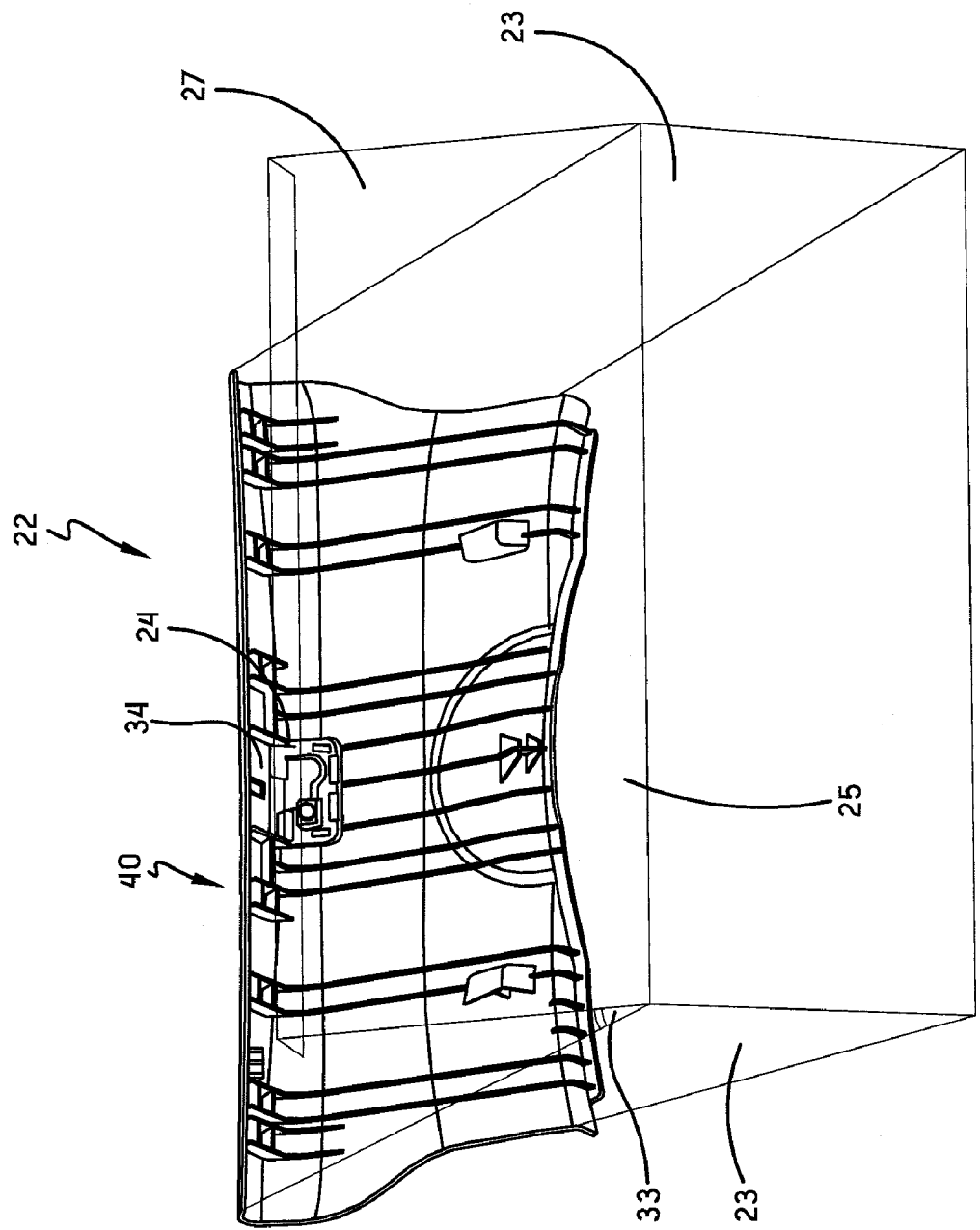
FIG. 3A is a perspective view of a rear storage compartment portion using a cover assembly according to one embodiment of this invention.

With reference now to FIGS. 3 and 3A, the storage compartment assembly 38 may include a storage compartment 33 and a lid or top 27. The storage compartment 33 may have side walls 23 and a floor portion 25 though the specific design of the storage compartment 33 is not important for this invention. The lid 27 may be placed in a "closed" position where it covers the storage compartment 33 to protect any cargo stored in the storage compartment 33. The lid 27 may also be placed in an "open" position where it permits access to the storage compartment 33 for use in loading or unloading cargo. To move the lid 27 between its closed and open positions, it may be pivotally connected to the storage compartment 33 though the specific way in which the lid 27 is adjusted between a closed and open position is not important for this invention.

Figure 4:
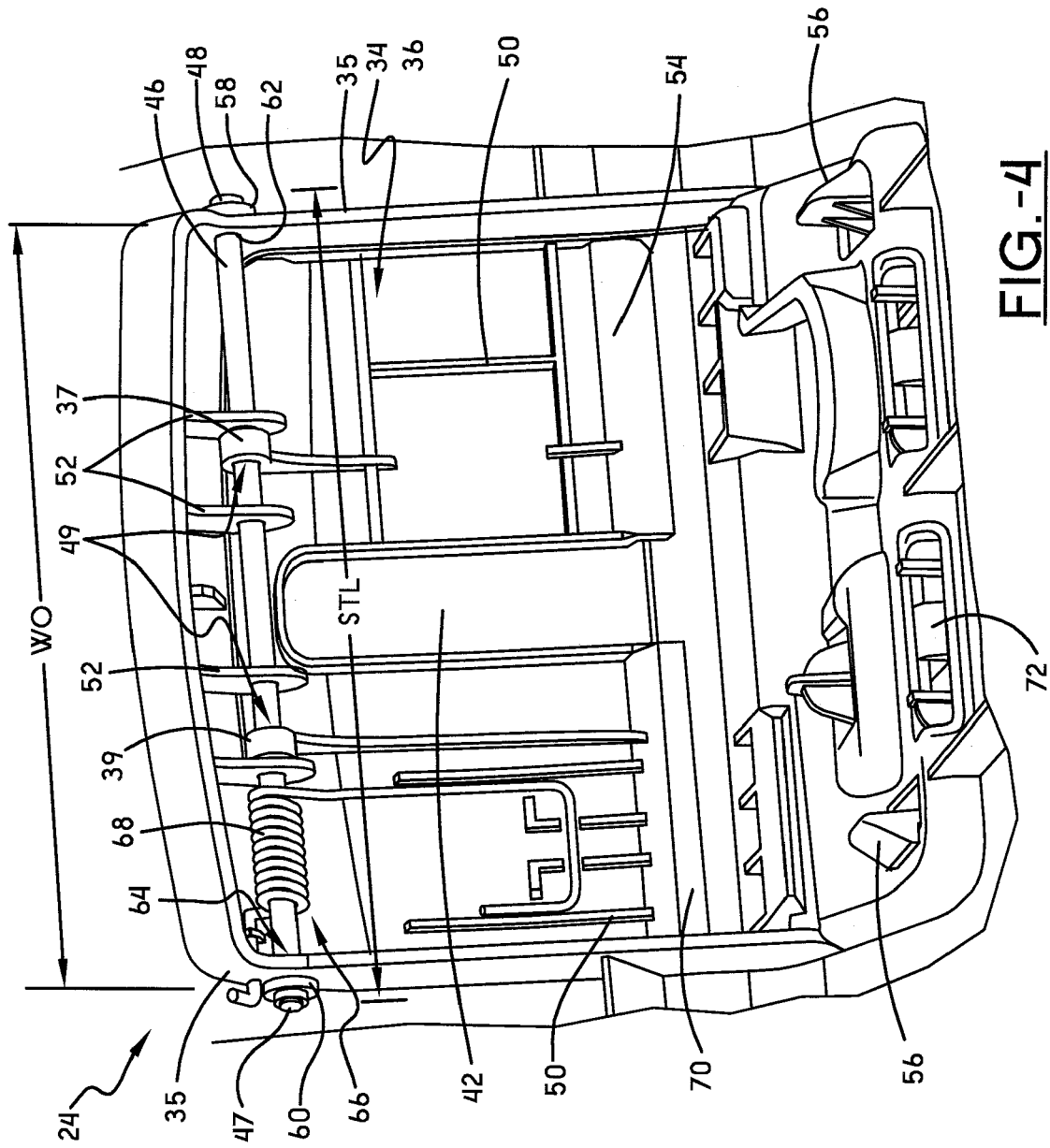
FIG. 4 is a close-up perspective view of the cover assembly shown in FIG. 3.
Figure 5:
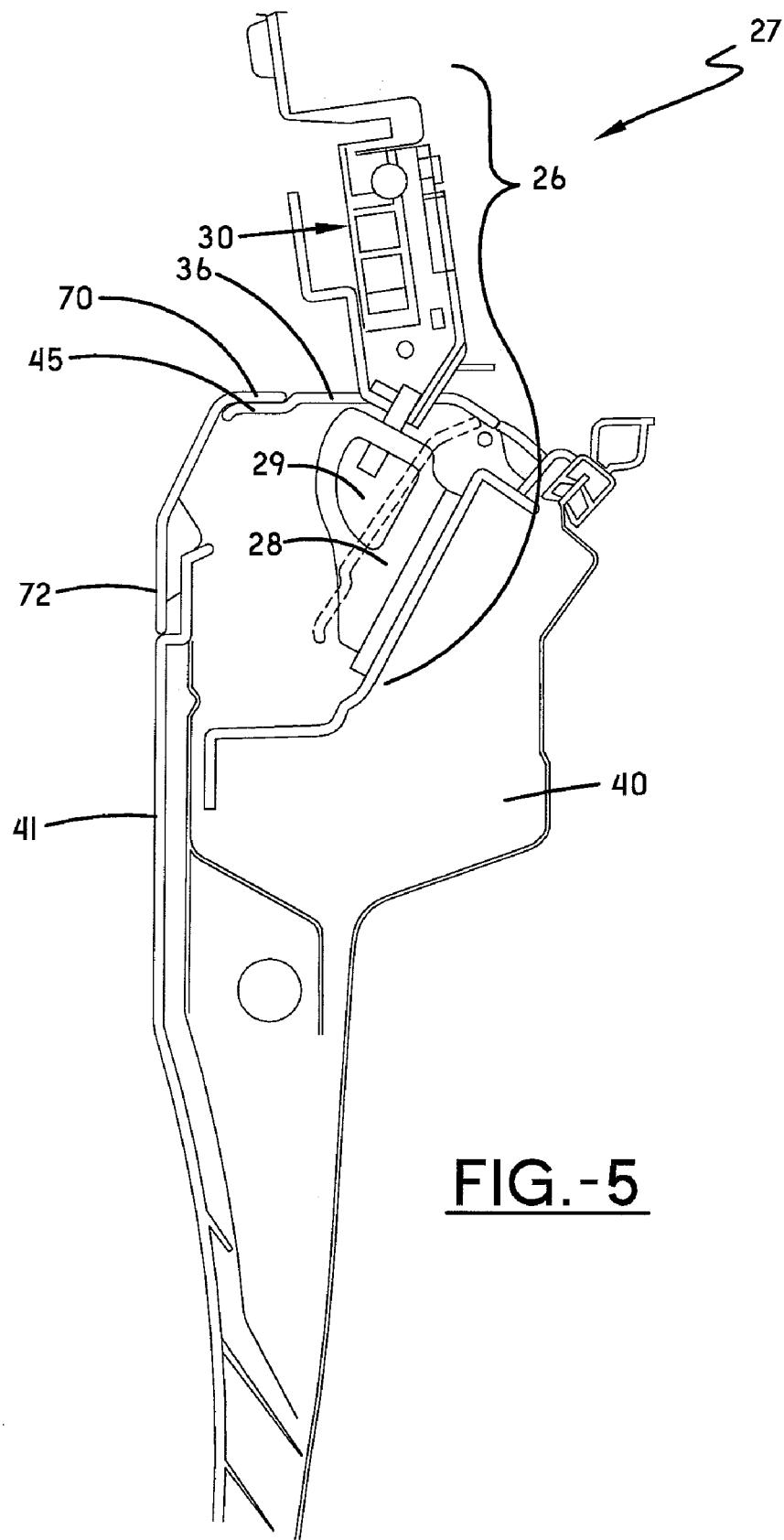
FIG. 5 is a sectional schematic view of the connection mechanism according to one embodiment of this invention.

With reference now to FIGS. 3, 3A, 4, and 5, a connection mechanism 26 may be used to connect the lid 27 to the storage compartment 33. In one embodiment, as shown in FIG. 5, the connection mechanism 26 may be made up of two parts: a striker 28 and a latch mechanism 30. As is well known by those of skill in the art, the latch mechanism 30 engages the striker 28 in to hold the lid 27 to the storage compartment 33. For the embodiment shown, the striker 28 has or defines a groove 29 that receives a pivotal component (not shown) of the latch mechanism 30. To open the lid 27, the pivotal component is moved out of engagement with the groove 29 in the striker 28. In one embodiment, the connection mechanism 26 also includes a lock mechanism (not shown). As the operation of latch mechanisms 30 are well known to those of skill in the art, further detail will not be provided here.

With reference again to FIGS. 3 and 3A, it should be noted that the striker 28 is positioned within an opening 34. By placing the striker 28 within the opening 34, the striker 28 is less conspicuous and thus is less likely to interfere with the loading and unloading of cargo from the storage compartment assembly 38. To assist with identifying the location of this invention, the term "compartment portion" will now be defined. Compartment portion, given reference number 40, is the portion of the storage compartment assembly 38 that comprises the opening 34 and thus the striker 28. For the embodiment shown, the compartment portion 40 is formed in the storage compartment 33 while the latch mechanism 30 is attached to the lid 27. In another embodiment, the compartment portion 40 is formed in the lid 27 and the latch mechanism 30 is attached to the storage compartment 33. It should be understood that this invention will work well regardless of the location of the compartment portion 40.

With reference now to FIGS. 3, 3A and 4, the cover assembly 24 is used to cover the opening 34 formed in the compartment portion 40. The cover assembly 24 may include a shaft 46 and a flap 36 that is pivotally attached to the shaft 46. The flap 36 covers the opening 34 whenever the lid 27 is in the open position. As the lid 27 is placed into the closed position, the latch mechanism 30 contacts the flap 36, causing the flap 36 to pivot with respect to the shaft 46 so that the latch mechanism 30 can engage the striker 28 in a known manner. The cover assembly 24 may also include a biasing device 66 that in one embodiment is a spring that biases the flap 36 into the position to cover the opening 34. In a specific embodiment, as shown in FIG. 4, the spring 66 may be supported by the shaft 46 extending through the torsion loops 68 of the spring 66. While a single torsion spring 66 is shown, it is to be understood that any biasing device chosen with the sound judgment of a person of skill in the art will work well with this invention. Some non-limiting examples include two or more torsion springs, other types of springs, a living hinge, etc. The biasing strength of the spring 66 can be devised using calculations that are well known in the art and can be used with sound judgment of a person of skill in the art. Additionally, in another embodiment, if increased spring strength or durability is desired, multiple springs can be used.

With reference now to FIG. 4, depending on the size and shape of the opening 34, the cover assembly 24 may also include a cap 54 that is used to cover a portion of the opening 34. It should be understood, however, that a cap 54 is not required for this invention. In one embodiment, the cap 54 may be fixed to the opening 34 and may be used to prevent the flap 36 from rotating above the opening 34. The cap 54 has male prongs 56 that are designed to be mated and fastened to the holes in the compartment portion 40. The method and arrangement disclosed in FIG. 4 should not be limiting, as there are many different arrangements to securely fasten the cap 54 to the compartment portion 40.

With further reference to FIG. 4, spanning the opening 34 is the shaft 46. In one embodiment, the shaft may be constructed of a metal. As a nonlimiting example, aluminum may be used. The shaft 46 has a knurled end 48 and a length STL. Knurling is the process of applying a texture to a cylindrical object and, as a result of the texturing process, the outer diameter of the shaft 46 increases due to the permanent deformation of the shaft's 46 material during the texturing process. Knurling one end of the shaft 46 aids in manufacture of the cover assembly 24 by allowing for quick construction without the use of conventional mechanical fasteners.

Also shown in FIG. 4 are the first and second extension surfaces, 58 and 60 respectively. The length STL of the shaft is long enough to span the opening 34 and fasten the shaft 46 into the first and second extension surfaces 58 and 60. The extension surfaces 58 and 60 are designed to accept the opposing ends of the shaft 46. First exterior support ribbing hole 62 and extension surface 58 may be designed to accept the end of shaft 46 having the knurled end 48. The second support ribbing hole 64 may be adapted to have the shaft's 46 non-knurled end 47 be press-fit into the correct position through the exterior support ribbing hole 62 and the extension surface 60. In yet another embodiment, the first and second extension surfaces 58 and 60 may provide support to the shaft 46 after being inserted through the exterior support ribbing holes 62 and 64.

Again with reference to FIG. 4, bordering the opening 34 on three of the four sides may be the exterior support ribbing 35. The exterior support ribbing 35 is a component of the compartment portion 40 and may, in one embodiment, define the boundaries of the opening 34. The opening 34 may have a width WO about a plane that is parallel to the shaft's 46 length STL. In one embodiment, shown, the width WO is measured from the one side of the exterior support ribbing 35 to the opposing side of the exterior support ribbing 35.

In one embodiment, the ratio of the shaft total length STL to the width of the opening WO, STL/WO, is less than 1.5. It a more specific embodiment, the ratio STL/WO is less than 1.2. This ratio is represents one of the improvements over the prior art. In the current embodiment, the shaft 46 is supported by the exterior support ribbing 35 and the related the first and second extension surfaces 58 and 60 as opposed to the shaft being supported by metal brackets bolted to the compartment portion. This elimination of material reduces material cost, reduces manufacturing time and simplifies the design of the cover assembly 24.

With reference now to FIG. 4, the flap 36 receives support via first and second flap support eyelet, 37 and 39 that are adapted to receive the shaft 46 via eyelet openings 49. The shaft 46 is inserted into the support eyelets 37, 39 and thereby gains support of the shaft 46. The number of eyelets shown is merely one embodiment and is not meant to be limiting. The support eyelets 37 and 39 may extend out of the flap 36 and provide an additional method of support for the flap 36. Additionally, the support eyelets 37, 39 may permit the flap 36 an axis with which it can rotate. The shaft 46 may also act as the foundation for the mechanism by which the flap 36 rotates. When the shaft 46 is inserted into the support eyelets 37, 39 and thereby gains support of the shaft 46, the support eyelets 37, 39 allow for the flap 36 to rotate about the axis defined by the shaft 46. Additionally, the exterior support ribbing 35 may provide additional support for the shaft 46 in the form of support pillars 52 which extend from the exterior support ribbing 35 of the compartment portion 40.

Figure 6:
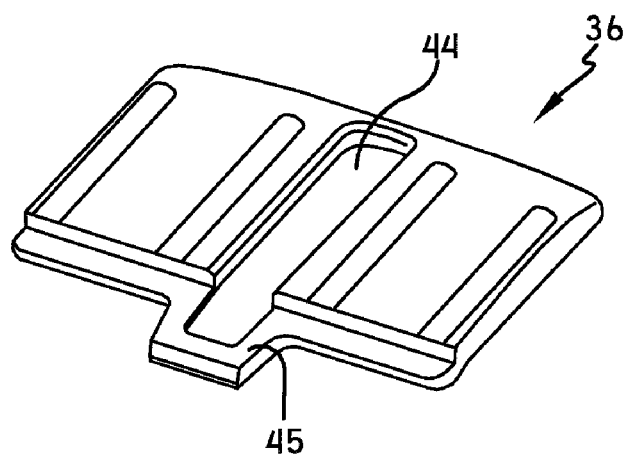
FIG. 6 is a schematic view of the cover assembly flap according to one embodiment of this invention.
Figure 7:
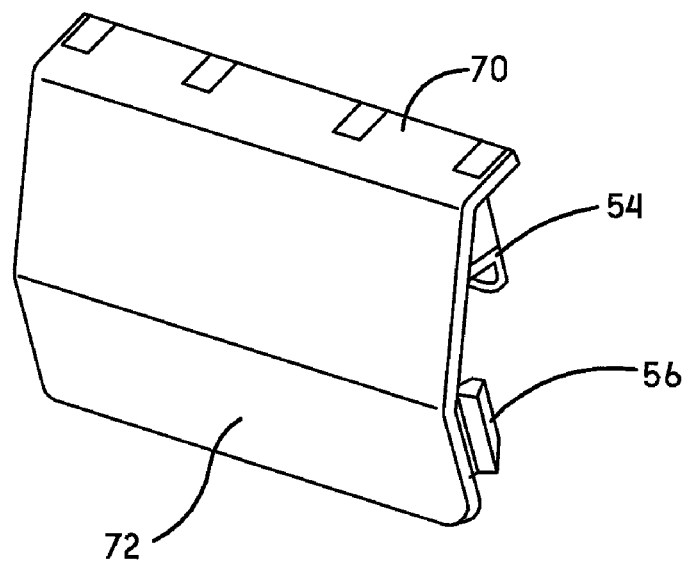
FIG. 7 is a schematic view of the cover assembly cap according to one embodiment of this invention.

Again referring to FIG. 4, the flap 36 is capable of having several different shapes. In one embodiment, the flap 36 has a U-shaped opening 42 in the center of the flap 36 and continues to the exterior bounds of the flap 36. In another embodiment, and as shown in FIG. 6, the flap 36 has an ovular opening 44 that has a continuous closed boundary within the flap 36, where the flap extension 45 provides additional support to the flap 36. As shown in FIG. 4, the U-shaped opening 42 permits unobstructed access to the striker 28 when the flap 36 is rotated. Any shape can be used for the opening 42, as long as access to the striker 28 can be obtained by the latch mechanism 30. Additionally, in another embodiment, FIG. 4 shows the support ribbing 50 on the underside of the flap 36. The support ribbing 50 reinforces the flap 36 which will prevent any degradation of the flap 36 in the many operations it will have during its lifetime.

Additionally, with reference to FIG. 4, when beginning to assemble the cover assembly 24, the process begins with the compartment portion 40. The shaft 46 should be inserted into the first exterior support ribbing hole 62. The shaft 46 should continue being inserted going past the first of the support pillars 52 and through the first flap support eyelets 37, past two additional support pillars 52 and through the second flap support eyelet 39. After the shaft 46 passes another support pillar 52, the shaft 46 is inserted through the spring's 66 torsion loops 68. After emerging from the torsion loops 68, the shaft is inserted into the second exterior support ribbing hole 64. At that point the knurled end 47 of the shaft 46 is secured to the second extension surface 60, as well as the trailing end of the shaft 46 being press-fit into the first extension surface 58. Once the shaft 46 is secured into position and the flap 36 is able to rotate, the cap 54 can be installed. By using the top portion 70 of the cap 54 to hold the flap 36 in position, the bottom portion 72 of the cap can be fastened to the compartment portion 40.

With further reference to FIG. 4, once the compartment portion 40 and cover assembly 24 is in the finished state, only the flap 36 is visible to the user. As shown in FIG. 3, is the concealed portion 43 of the compartment portion 40. The opposing side of the compartment portion 40 (the viewed portion 41—not shown) is what is visible by the user when accessing the finished storage compartment assembly 38.

Again, with reference to FIG. 4, during operation of the cover assembly 24, if there is no force being applied to the cover assembly 24, the spring 66 supports the flap 36 to a concealing position. This position consists of the flap 36 concealing the striker 28 in the opening 34 and creating a continuous plane on the viewed portion 41 of the storage compartment portion 40. Additionally, the cover assembly is only visible to the user when the trunk lid is open giving access to the storage compartment 38. Assuming that the trunk lid is in the open position, and the user desires to close the trunk lid and eliminate access to the storage compartment 38, the user applies a downward force to the trunk lid. The trunk lid and latch mechanism 30 moves closer to coming in contact with the cover assembly 24, and as the two components come in contact, the flap 36 rotates, with the downward force overcoming the bias of the spring 66. The striker 28 remains stationary inside the opening 34. As shown in FIG. 5, the latch mechanism 30 relocates itself (via the trunk lid) to come together with the striker 28 in the opening 34. Once the latch mechanism 30 contacts the striker 28, the latch mechanism 30 fastens to the striker 28 effectively locking the trunk lid to the automobile and sealing the storage compartment 33. As long as the lid 27 remains closed, the cover assembly 24 remains in an open position. Only when the lid 27 is opened does the cover assembly 24, and specifically the flap 36 rotate into a closed position.

Numerous embodiments have been described, hereinabove. It will be apparent to those skilled in the art that the above methods and apparatuses may incorporate changes and modification without departing from the general scope of this invention. It is intended to include all such modification and alterations in so far as they come within the scope of the appended claims or the equivalents thereof.

Having thus described the invention, it is now claimed:

1. A vehicle comprising:
    (A) a frame;
    (B) a locomotion source operatively supported to the frame that provides locomotion for the vehicle;
    (C) a storage compartment assembly comprising:
        (1) a storage compartment operatively supported to the frame;
        (2) a lid that is closeable to substantially cover the storage compartment and that is openable to provide access to the storage compartment; and,
        (3) a compartment portion formed in either the storage compartment or the lid, the compartment portion having an opening;
    (D) a connection mechanism that connects the lid to the storage compartment in a closed condition to cover at least a portion of the storage compartment, the connection mechanism comprising:
        (1) a striker positioned within the opening formed in the compartment portion; and,
        (2) a latch mechanism that latches to the striker, the latch mechanism positioned on the other of the storage compartment or the lid;

(E) a cover assembly that substantially covers the opening, the cover assembly comprising:
  (1) a flap that is positionable to cover at least a portion of the opening and that is positionable to provide access to the striker;
  (2) a shaft about which the flap pivots, the shaft having a first end with a knurled portion and a second end;
  (3) a shaft support structure that supports the shaft to the compartment portion; the shaft support structure comprising:
    (a) a first extension surface positioned on one side of the opening and having a first hole that receives the knurled portion of the shaft creating a press fit with the first extension; and,
    (b) a second extension surface positioned substantially on the opposite side of the opening and having a second hole that receives the second end of the shaft; and,
  (4) a spring that biases the flap to cover the opening; and,
(F) wherein closing the lid: (1) causes a portion of the latch mechanism to contact the flap and pivot the flap to provide access to the post; and, (2) causes the latch mechanism to latch to the striker.

2. The vehicle of claim 1 wherein the compartment portion is formed in the storage compartment and the latch mechanism is positioned on the lid.

3. The vehicle of claim 1 wherein the compartment portion is formed in the lid and the latch mechanism is positioned on the storage compartment.

4. The vehicle of claim 1 wherein the shaft support structure has no metal.

5. The vehicle of claim 4 wherein the shaft support structure is made entirely of plastic.

6. The vehicle of claim 1 wherein the shaft support structure further comprises:
  a first support pillar extending from the compartment portion into the opening and into contact with the shaft.

7. The vehicle of claim 6 wherein the shaft support structure further comprises:
  a second support pillar extending from the compartment portion into the opening and into contact with the shaft.

8. The vehicle of claim 1 wherein the shaft extends across a width of the opening WO, the shaft has a total length STL, and the ratio of STL/WO is less than 1.5.

9. The vehicle of claim 8 wherein the ratio of STL/WO is less than 1.2.

10. The vehicle of claim 1 wherein the cover assembly includes only one spring, and the spring is a torsion spring.

11. The vehicle of claim 1 wherein the cover assembly further comprises:
  a cap member that limits the motion of the flap in the biased direction.

12. The vehicle of claim 1 wherein:
  the flap has a slot bordered all around by flap material; and,
  the slot receives the striker when the flap is positioned to provide access to the post.

13. A method comprising the steps of:
(A) providing a vehicle comprising: a frame, a locomotion source operatively supported to the frame that provides locomotion for the vehicle, and a storage compartment assembly comprising a storage compartment, a lid and a compartment portion and a connection mechanism; the connection mechanism having a striker in an opening of the compartment portion, a latch mechanism that latches to the striker and secures the lid to the storage compartment;
(B) providing a cover assembly comprising: a flap that covers at least a portion of the opening having a first and a second support sleeve, a shaft having a first end with a non-knurled portion and a second end having a knurled portion; a support structure having an extension surface having a first hole on one side of the opening and a second hole on the opposing side of the opening; and a spring;
(C) inserting the first end of the shaft into the first hole on the first side of the support structure opening;
(D) inserting the non-knurled end of the shaft into the first flap support eyelet;
(E) inserting the non-knurled end of the shaft into the second flap support eyelet;
(F) inserting the spring around the non-knurled end of the shaft;
(G) inserting the non-knurled end of the shaft into the second hole on the opposing side of the support structure opening;
(H) fastening the shaft in place by positioning the knurled portion of the shaft into the first hole on the first side of the support structure; and,
(I) securing the spring into the flap support position.

14. The method of claim 13 wherein prior to step (C) the method comprises the step of:
  placing the flap over the compartment portion.

15. The method of claim 13 further comprising the step of:
  placing a cap over the opening and over the flap.

16. The method of claim 13 wherein prior to step (d) the method comprises the step of:
  inserting an additional spring around knurled end of the shaft.

* * * * *